US006822726B2

(12) United States Patent
Ono et al.

(10) Patent No.: US 6,822,726 B2
(45) Date of Patent: Nov. 23, 2004

(54) ANIMATION PRODUCTION APPARATUS

(75) Inventors: Toshihide Ono, Kariya (JP); Keiji Mitsuyuki, Aichi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/353,292

(22) Filed: Jan. 29, 2003

(65) Prior Publication Data

US 2003/0142272 A1 Jul. 31, 2003

(30) Foreign Application Priority Data

Jan. 31, 2002 (JP) ....................................... 2002-023865

(51) Int. Cl.[7] .......................... G03B 21/32; G06T 13/00
(52) U.S. Cl. ....................................... 352/87; 345/473
(58) Field of Search ........................... 352/87; 345/373, 345/374, 375

(56) References Cited

U.S. PATENT DOCUMENTS 5,577,175 A * 11/1996 Naka et al. ................. 345/427
6,462,741 B1 * 10/2002 Nishihata .................... 345/473
6,608,624 B1 * 8/2003 Wang ......................... 345/473

FOREIGN PATENT DOCUMENTS

JP 9-311946 12/1997
JP 10-134202 5/1998

* cited by examiner

*Primary Examiner*—David Gray
*Assistant Examiner*—Arthur A Smith
(74) *Attorney, Agent, or Firm*—Harness, Dickey & Pierce, PLC (57) ABSTRACT

In producing an animation by making a combination of basic motions of a moving body, an animation production apparatus acquires a type of each of the basic motions constituting a predetermined motion, acquires spatial data on an object, including the moving body, in a virtual space for each of the basic motions, produces key frames corresponding to each of the basic motions, acquires motion time information for each of the basic motions, produces an animation on the basis of the key frames and the motion time information, stores animation information including the spatial data and the motion time information in a state associated with each of the basic motions, extracts reusable information from the animation information for each of the basic motions at an alteration of an animation, and stores a previously produced motion procedure as a work model. This enables efficient and easy alteration of a produced animation.

5 Claims, 11 Drawing Sheets

| | BASIC MOTION ACCOMPANIED BY POSTURE CHARGE ? (S1751) | MOTION OBJECT NAME CHANGED ? (S1753) | MOTION OBJECT POSITION CHANGED ? (S1755) | START POSITION CHANGED ? (S1752) | DEGREE OF DATA REUSE |
|---|---|---|---|---|---|
| 1 | YES | NO | NO | NO | REUSE OF ALL DATA |
| 2 | YES | NO | NO | YES | REUSE OF FINAL POSTURE |
| 3 | YES | NO | YES | NO | REUSE OF OBJECT NAME AND HAND RELATIVE POSITION |
| 4 | YES | NO | YES | YES | REUSE OF OBJECT NAME AND HAND RELATIVE POSITION |
| 5 | YES | YES | — | NO | RE-INPUT |
| 6 | YES | YES | — | YES | RE-INPUT |
| 7 | NO | NO | — | — | REUSE OF ALL DATA |
| 8 | NO | YES | — | — | RE-INPUT (REUSE OF POSTURE) |

ANIMATION PRODUCTION APPARATUS

BACKGROUND OF THE INVENTION

1) Field of the Invention

The present invention relates to an animation production apparatus designed to produce animations about actions of persons and motions of objects appendant thereon.

2) Description of the Related Art

So far, as a method of producing animations about actions of persons and motions of objects attendant thereon, there has been known a key frame technique in which several frames constituting keys of motions of appearing objects are drawn to produce moving images which complements motions among these key frames. In addition, there has been a simulation tool (ERGOMan; produced by DELMIA) which provides the meanings with respect to the motions among the key frames on the basis of the key frame technique and utilizes an MTM (Method Time Measurement) forming one of time analyzation technique to automatically set a time between the key frames.

However, these techniques are made to put frames or variations among the frames on an initial frame in time sequence and, hence, create a problem that, if at least one portion of the contents of the animation varies en route, there is a need to re-input all information related to the subsequent animation production.

SUMMARY OF THE INVENTION

The present invention has been developed in consideration of the above-mentioned problem, and it is therefore an object of the invention to provide an animation production apparatus, designed to produce animations on the basis of combinations of basic motions of moving bodies, which enables efficient and easy alteration of an animation after produced.

The present inventors have completed the present invention by taking note of the fact that there is a case in which the alteration does not subsequently exerts influence on the types of the basic motions, that there is a case in which there is no influence thereof on objects of motions and space coordinates, and that there is a case in which the key frames themselves are shifted in time sequence but the time between the key frames does not vary.

For this purpose, in accordance with the present invention, there is provided an animation production apparatus which makes a combination of basic motions each constituting a minimum unit of a motion of a moving body to produce an animation in which the moving body makes a predetermined motion in a virtual space in accordance with a predetermined motion procedure, comprising basic motion acquiring means for acquiring a type of each of the basic motions constituting the predetermined motion, spatial data acquiring means for acquiring spatial data forming positional information on an object, including the moving body, in the virtual space for each of the basic motions, key frame producing means for producing a key frame corresponding to each of the basic motions, motion time information acquiring means for acquiring motion time information including a motion time taken for each of the basic motions and a motion start time of each of the basic motions, animation producing means for producing an animation on the basis of the key frame and the motion time information according to a key frame method, animation information storing means for storing animation information including the spatial data and the motion time information in a state associated with each of the basic motions, and reusable information extracting means for extracting reusable information from the animation information for each of the basic motions at an alteration of the animation.

With this configuration, when a user alters the contents of the animation, it is possible to eliminate the need for re-inputting of all the information after the time of the alteration and to make the most of the animation information before the alteration, thus efficiently and easily enabling the production of an animation incorporating the alteration. In this specification, for example, in a case in which the moving body is a human body model which works in a manual fashion, the "spatial data" also includes data such as a standing position, hand position and a posture.

In addition, according to the invention, the animation production apparatus further comprises work model storing means for storing the motion procedure, previously produced, as a work model, and the basic motion acquiring means acquires the type of each of the basic motions constituting the predetermined motion through the use of the work model.

Thus, when the user inputs necessary matters in producing or altering an animation, the input operation is easily and efficiently achievable.

Still additionally, according to the invention, the animation production apparatus further comprises basic motion judging means for making a judgment as to whether the type of the basic motion forming an object of alteration is related to a change of the spatial data, and the reusable information extracting means extracts reusable information on the basis of a result of the judgment in the basic motion judging means.

Thus, owing to the classification among the types of the basic motions, if the basic motion is not accompanied by the change of the spatial data, because of no possibility of variation in posture of the moving body, a decision can be made that the animation information before the time of the alteration is reusable basically.

Moreover, according to the invention, the animation production apparatus further comprises motion object judging means for, when an object of motion resides in the basic motion forming an object of alteration, making a judgment as to whether the motion object undergoes a change due to an alteration of the animation, and the reusable information extracting means extracts the reusable information on the basis of a result of the judgment in the motion object judgment means.

This is based on that a change of the motion object makes it unfeasible to reuse the animation information before the time of the alteration, and requires the re-inputting of all the information.

Still moreover, according to the invention, the animation production apparatus further comprises motion object position judging means for making a judgment as to whether a position of the motion object undergoes a change due to the alteration of the animation, and the reusable information extracting means extracts the reusable information on the basis of a result of the judgment in the motion object position judging means.

This is based on that a change of the position of the motion object permits the reuse of the name of the motion object and the relative position of a hand.

The above-mentioned respective means correspond to the concrete means to be described in an embodiment which will be described later.

BRIEF DESCRIPTION OF THE DRAWINGS

Other objects and features of the present invention will become more readily apparent from the following detailed description of the preferred embodiment taken in conjunction with the accompanying drawings in which.

DESCRIPTION OF THE PREFERRED EMBODIMENTS

An embodiment of the present invention will be described hereinbelow with reference to FIGS. 1 to 11. An animation production apparatus according to this embodiment is for producing an animation for use in a simulation for design and evaluation of a predetermined operation process.

Figure 1:
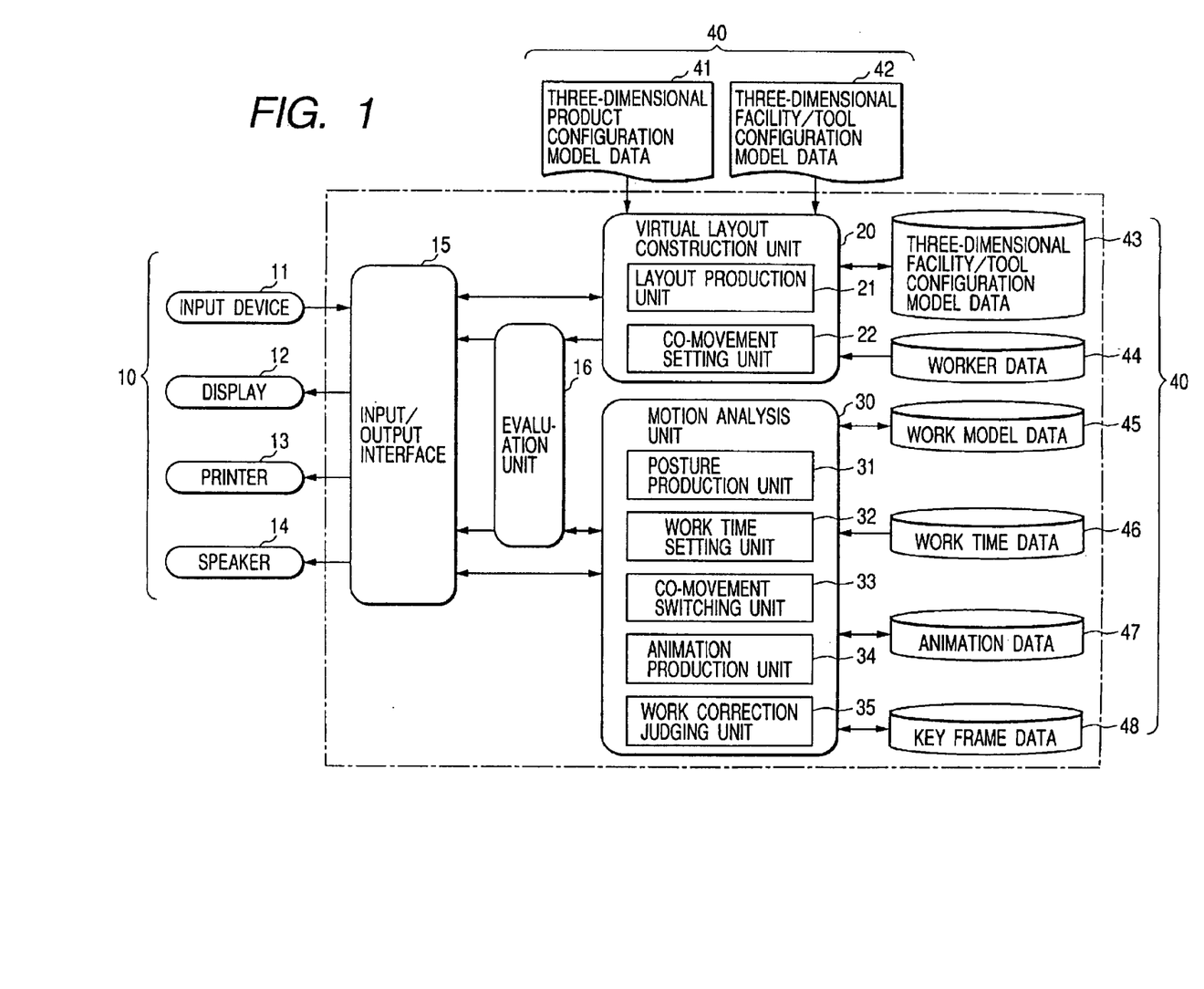
FIG. 1 is a conceptual illustration of a configuration of an animation production apparatus according to an embodiment of the present invention.

FIG. 1 is an illustration of an entire configuration of the animation production apparatus according to this embodiment.

As FIG. 1 shows, the animation production apparatus according to this embodiment is made up of an input/output unit 10, a virtual layout construction unit 20, a motion analysis unit 30 and a database 40.

The input/output unit 10 is composed of an input device 11 including a keyboard and a mouse and an output device including a display 12, a printer 13 and a speaker 14. Moreover, the animation production apparatus further includes an input/output interface 15 and an evaluation unit 16 for implementing various kinds of evaluations/judgments.

The virtual layout construction unit 20 is composed of a layout production unit 21 and a co-movement setting unit 22. The layout production unit 21 creates a layout of a work area in a virtual space of an animation, and the co-movement setting unit 22 sets the relationship between things which move with each other in the animation, that is, sets the things which are in an interlocked movement relation.

The motion analysis unit 30 is composed of a posture production unit 31, a work time setting unit 32, a co-movement switching unit 33, an animation production unit 34 and a work correction judging unit 35. The posture production unit 31 is made to produce key frames for the production of an animation. Each of the key frames is created for each basic motion forming a minimum unit of a motion, such as "Reach", "Move", "Turn", "Walk", "Grasp", "Position", "Release" and "Disengage". A combination of these basic motions produces a work content, for example, "Assemble Product".

In addition, the basic motions are phased into a plurality of difficulty levels (the difficulty levels of the basic motions are set in a step-by-step fashion). For example, in the case of the basic motion of the "Grasp", its difficulty level varies in accordance with the situation of an object being held, and for the "Reach", its difficulty level varies with a situation in the direction of "Reach". Even in the case of the same basic motion, the time needed therefor becomes longer as its difficulty level rises.

Figure 2:
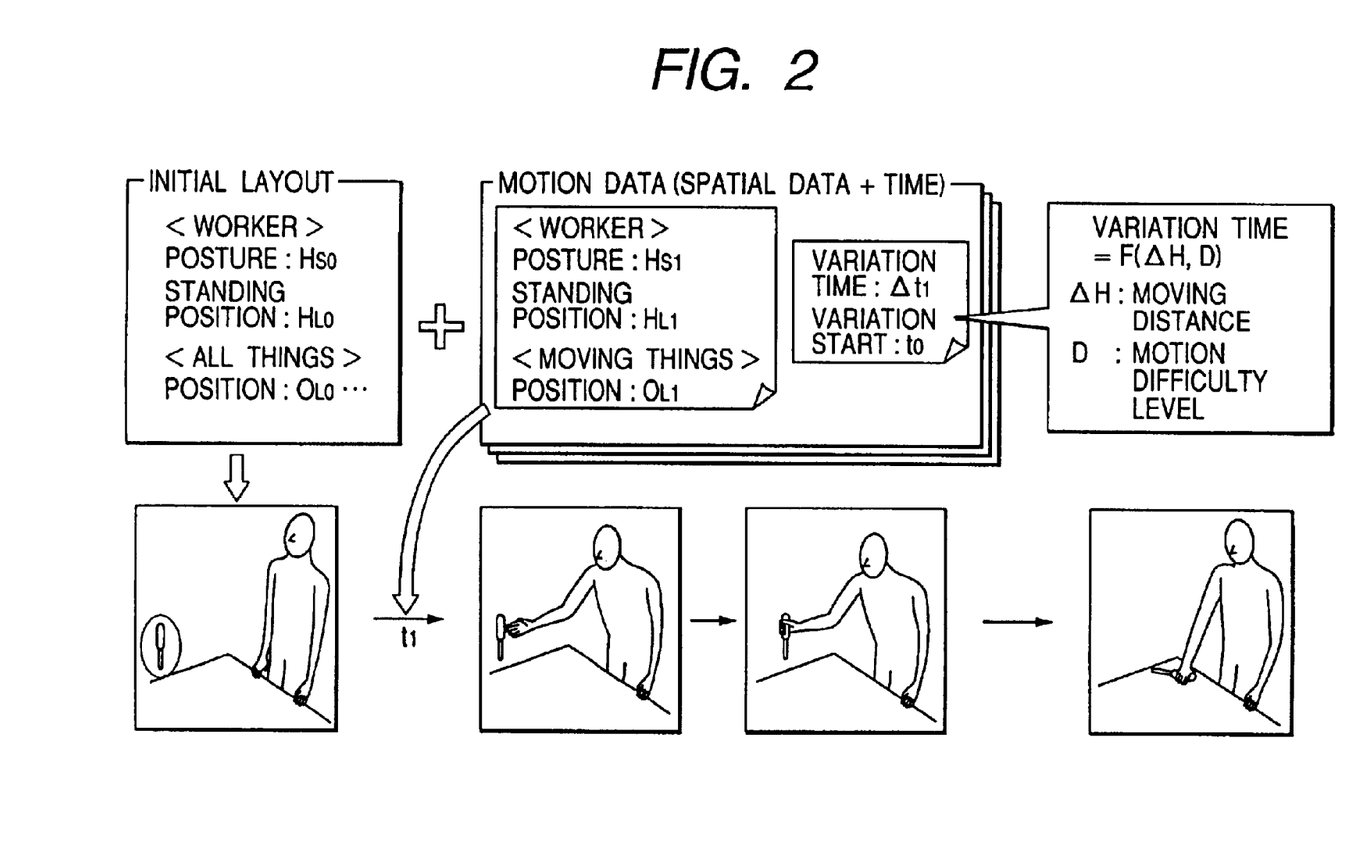
FIG. 2 is an illustration useful for explaining key frames each constituting a basic work.

FIG. 2 is an illustration of key frames constituting an animation in which a worker model shifts a driver, suspended, onto a working table. In this illustrated example, the animation is made up of key frames respectively corresponding to the basic motions of initial frame: a driver is in a suspended state→second frame: hold out his/her arm→third frame: hold the driver→fourth frame: carry the driver onto a table.

The initial frame contains animation data including a posture $H_{S0}$ and standing position $H_{L0}$ of the worker model and positions $O_{L0}$ of all things in a virtual space. Each of the second and subsequent frames has animation data including a posture $H_{Sn}$ and standing position $H_{Ln}$ of the worker model, a displacement quantity $\Delta O_L$ of a displacing thing and a variation start time t and a variation time $\Delta t$ of motion. The variation time $\Delta t$ is obtainable as a function of a hand moving distance and a motion difficulty level.

The work time setting unit 32 sets a time needed for the worker model to conduct a predetermined operation. The co-movement switching unit 33 performs the switching of the co-movement relation set in the co-movement setting unit 22. The animation production unit 34 specifies a shape or position of an object every several frames to produce an animation according to the key frame method which performs the complement or interpolation among the frames. The work correction judging unit 35 makes a judgment as to whether or not there is a need to correct the work contents of the produced animation.

The database 40 is composed of a three-dimensional product configuration (geometric) model database 41, a three-dimensional facility/tool configuration model database 42, a three-dimensional facility/tool configuration model database 43, a worker database 44, a work model database 45, a work time database 46, an animation database 47 and key frame database 48.

Each of the three-dimensional product configuration model database 41 and the three-dimensional facility/tool configuration model database 42 is an external database. The three-dimensional product configuration model database 41 retains three-dimensional configuration model data of a product, registered, and the three-dimensional facility/tool configuration model database 42 retains three-dimensional configuration model data on equipment, registered. Moreover, the three-dimensional facility/tool configuration model database 43, which is an internal database, stores three-dimensional configuration model data on facilities or tools, registered, and the worker database 44 stores human body models (moving bodies) on various types of workers which are classified according to height, weight, age phase, sex and others. Still moreover, the work model database 45 contains work models created in advance. The "work model" is made by recording a flow of basic motions constituting a standard work forming a predetermined elemental work, for example, "Drive Screw" or the like. In the case of a similar elemental work being inputted, there is no need to select the basic motion or the difficulty level thereof by referring to this work model.

In the work time database 46, there is registered a work time for each basic work which is obtained according to an MTM (Method Time Measurement) technique. The "work time" is determined on the basis of the type of a basic motion, moving distance and difficulty level.

The animation database 47 stores an animation produced in the animation production unit 34, and the key frame database 48 stores animation data associated with each of the key frames. The animation data related to each of the key frames contains a thing displaced, a displacement quantity thereof, a variation start time and a variation time.

Figure 3:
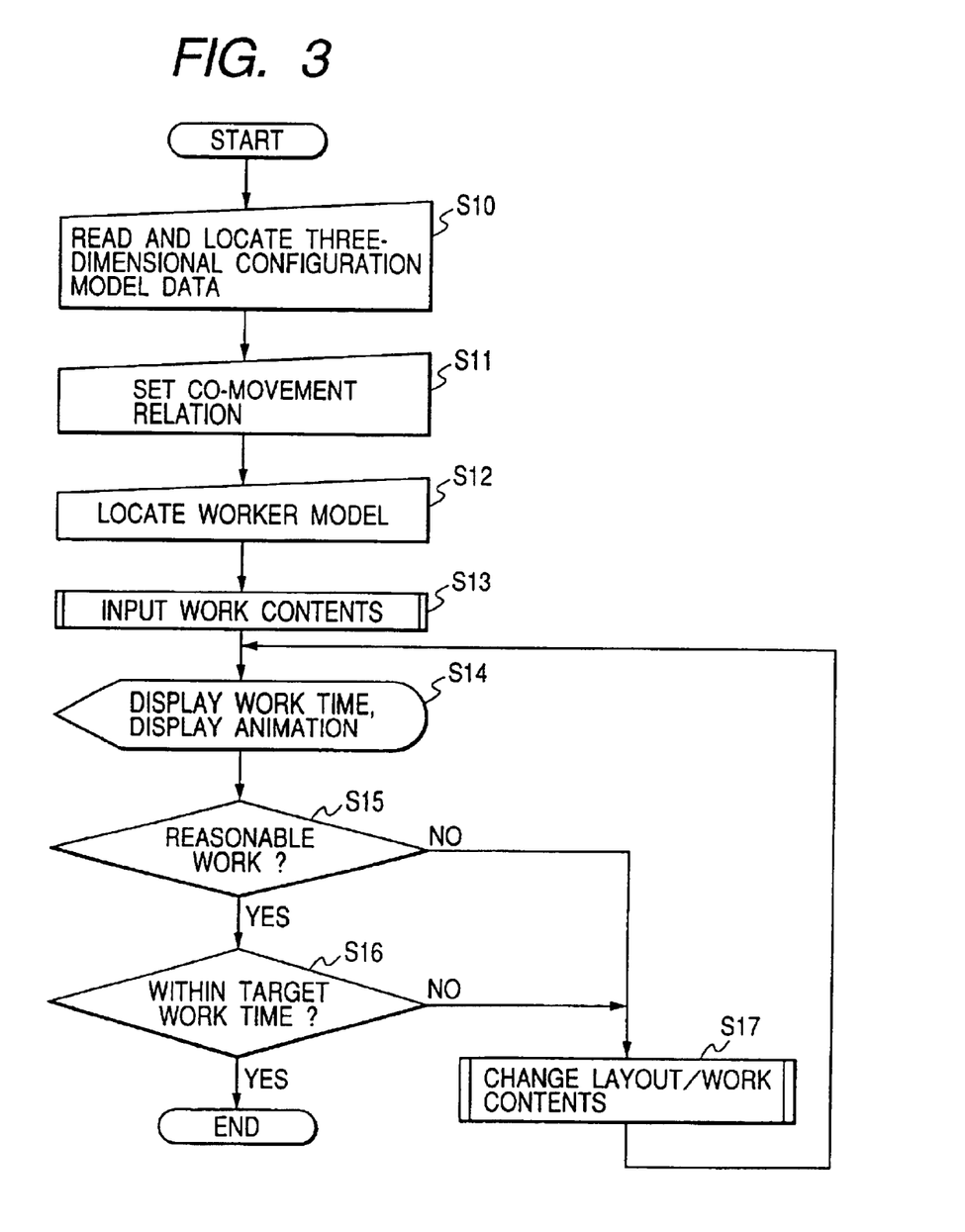
FIG. 3 is a flow chart showing a procedure of production of an animation on a simulation about a work conducted by a person.

Referring to a flow chart of FIG. 3, a description will be given hereinbelow of a procedure for animation production in the animation production apparatus according to this embodiment.

First of all, for constructing a work area in a virtual space of an animation, three-dimensional configuration data on things and facilities are read out from the databases 41 to 43, and these data are located in the virtual space (step S10).

Following this, for really expressing a work, an association (co-movement relation) is defined among things or facilities read into the virtual space (step S11). That is, a thing and a thing are defined which are required to be moved in a state associated with each other.

Then, parameters (sex, height, weight, age phase, and others) on a worker model undergoing simulation are selected so that a human body model is read out from the worker database 44 and located in the virtual space of the animation (step S12).

Subsequently, the work contents the worker model is to conduct in the virtual space are inputted (step S13), which will be described later.

Thereafter, the calculation of the work time and the production of an animation are automatically made in accordance with the work contents inputted in the step S13, and the produced animation is placed on the display 12 (step S14).

Furthermore, the user confirms the animation displayed, and makes a judgment as to whether or not the work contents have an unreasonable/useless portion (step S15), and makes a judgment as to whether the work finishes within the desired or target work time (step S16). If the work contents have no unreasonable/useless portion and the desired work time is reached, the simulation comes to an end. Otherwise, the alteration of location of the things and facilities and the alteration of the work contents and work sequence are made (step S15). The alteration of the work contents will be described later. Still additionally, the result after the alteration is again confirmed, and the aforesaid steps S14 to S17 are repeatedly implemented until the desired result is attained.

Figure 4:
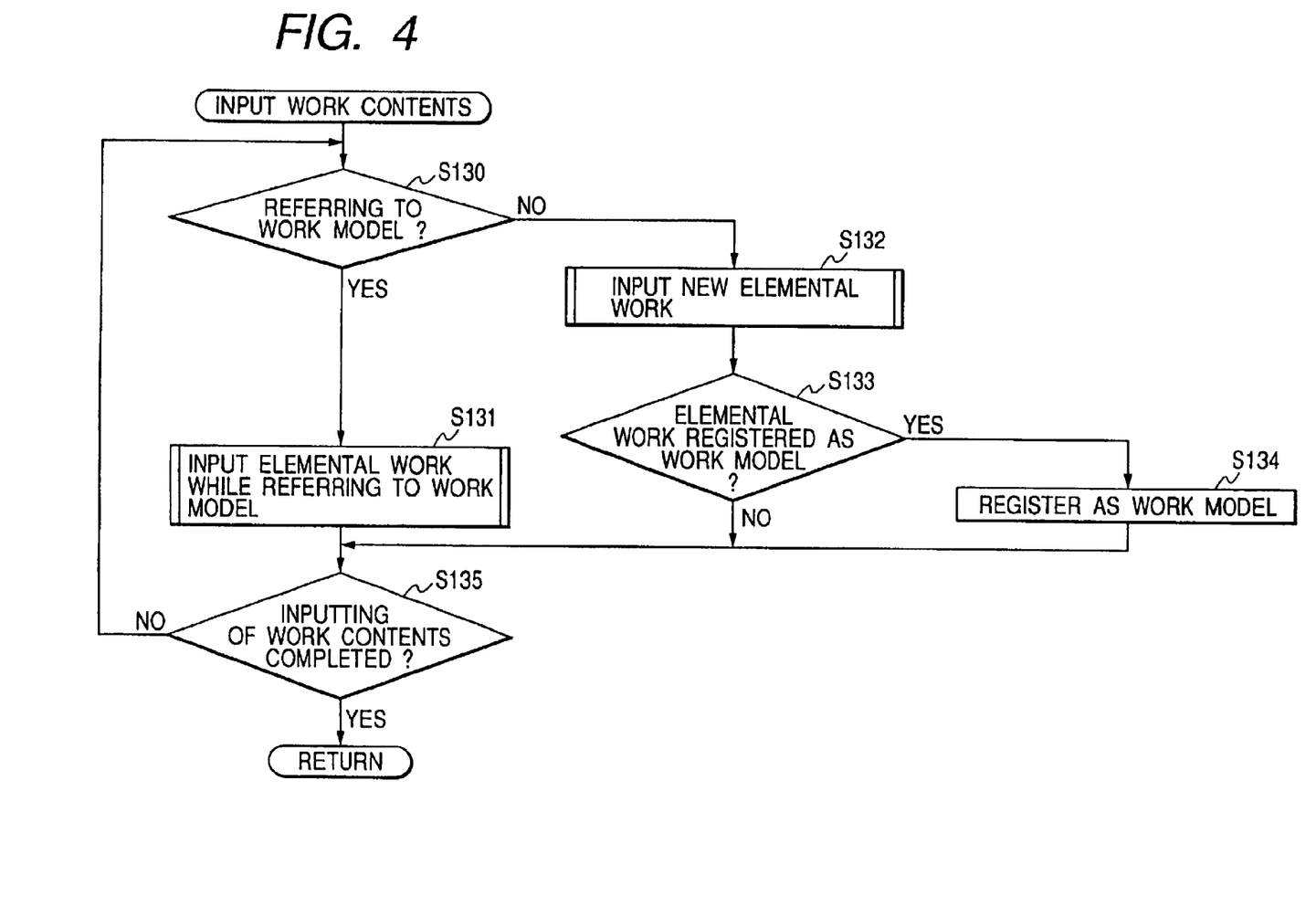
FIG. 4 is a flow chart showing an inputting procedure of work contents.

Referring to flow charts of FIGS. 4 to 6, a description will be given hereinbelow of a procedure for inputting work contents. In this embodiment, the simplification of the inputting of the work contents is achieved by utilizing the work model previously put (registered) in the database 45.

First, a selection is made between the input of the elemental works by referring to a work model or the input of the elemental work in a manner that the user selects the basic motions himself/herself (steps S130 to S132). In a case in which the user newly inputs the elemental work himself/herself, the inputted elemental work can be registered as a work model (steps S133 and S134).

In addition, with reference to a flow chart of FIG. 5, a description will be given hereinbelow of the inputting of the elemental work referring to a work model.

First, after the selection of a work model to be referred to by the user (step S1310), basic motions described in the work model and the difficulty levels thereof are automatically read in succession (step S1311).

Subsequently, when the user selects an object of motion and the position thereof (step S1312), a moving distance is automatically calculated (step S1313) and a position and a direction are automatically acquired from the worker model to make a judgment as to whether or not auxiliary motions, such as "Walk" or "Change Direction" are necessary (step S1314). If the judgment shows that the auxiliary motions are necessary, the user specifies the necessary auxiliary motions (step S1315).

Then, the posture of a worker model is automatically produced on the basis of a position of the worker model, the type of a basic motion and a position of an object of motion (step S1316). In this case, if necessary to produce a natural posture of the worker model, the user manually performs the fine adjustment of the posture.

Following this, a work time to be taken for a basic motion is automatically allocated using the work time database 46 (step S1317), and set as a time between the key frames, thus automatically producing an animation (step S1318). The start time of each of the key frames is the time of the completion of the last basic motion and corresponds to the accumulation of the moving times in each of the key frames.

The animation produced at this time is stored in the animation database 47, and the animation data is preserved in the key frame database 48 serving as a storage means in a state associated with each basic motion. For each basic motion, the animation data is composed of a type and difficulty level of the basic motion, a name of an object of motion and an absolute position (destination position in the case of moving), a posture (articular angles) of a worker, a relative position of a hand with respect to an object, a displacement of a moving thing, time information (motion start time, displacement time).

The aforesaid steps S1310 to S1318 are repeatedly implemented with respect to all the basic motions constituting the elemental work (step S1319).

Figure 5:
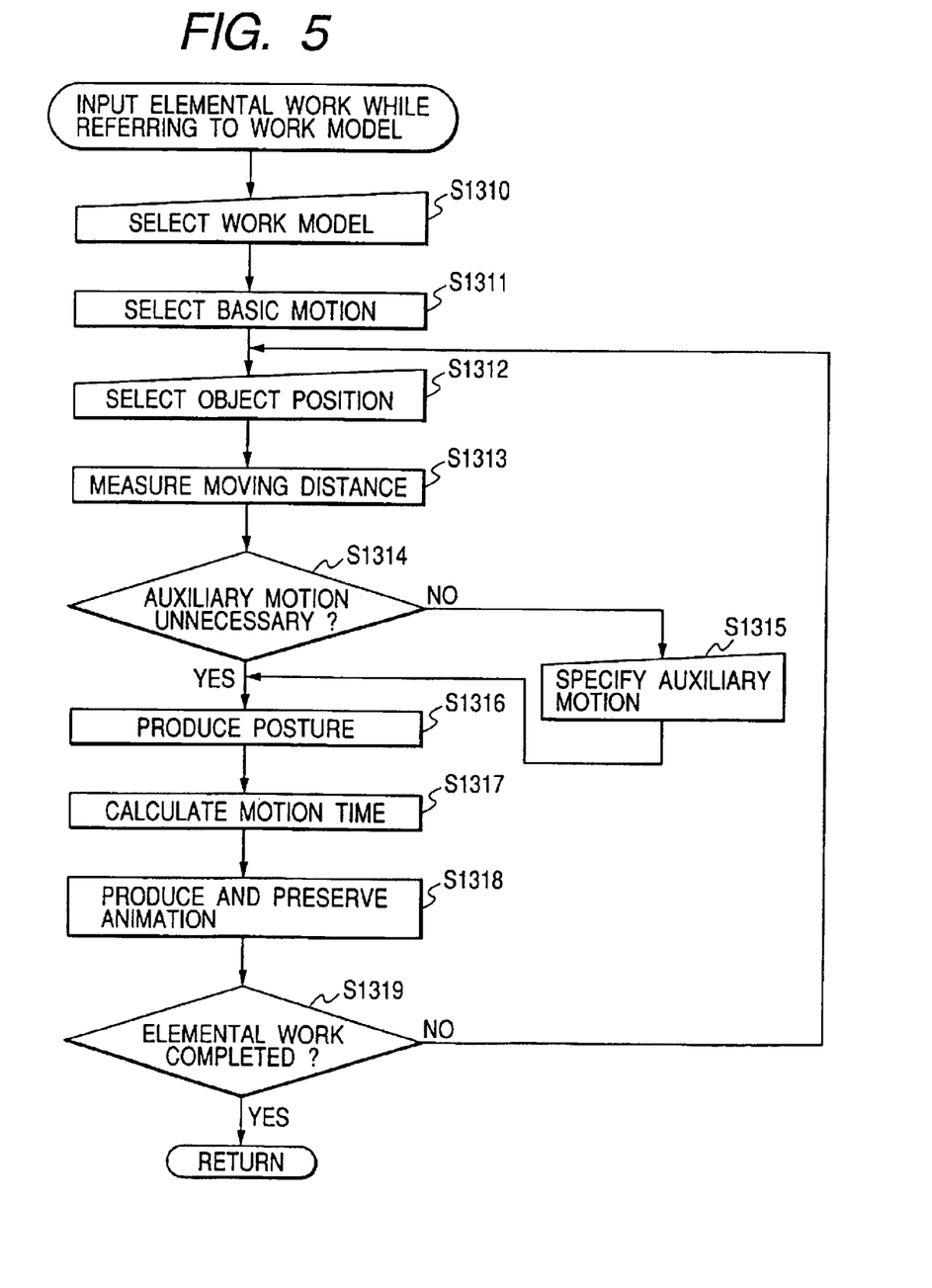
FIG. 5 is a flow chart showing a procedure for inputting work contents through the use of a work model.
Figure 6:
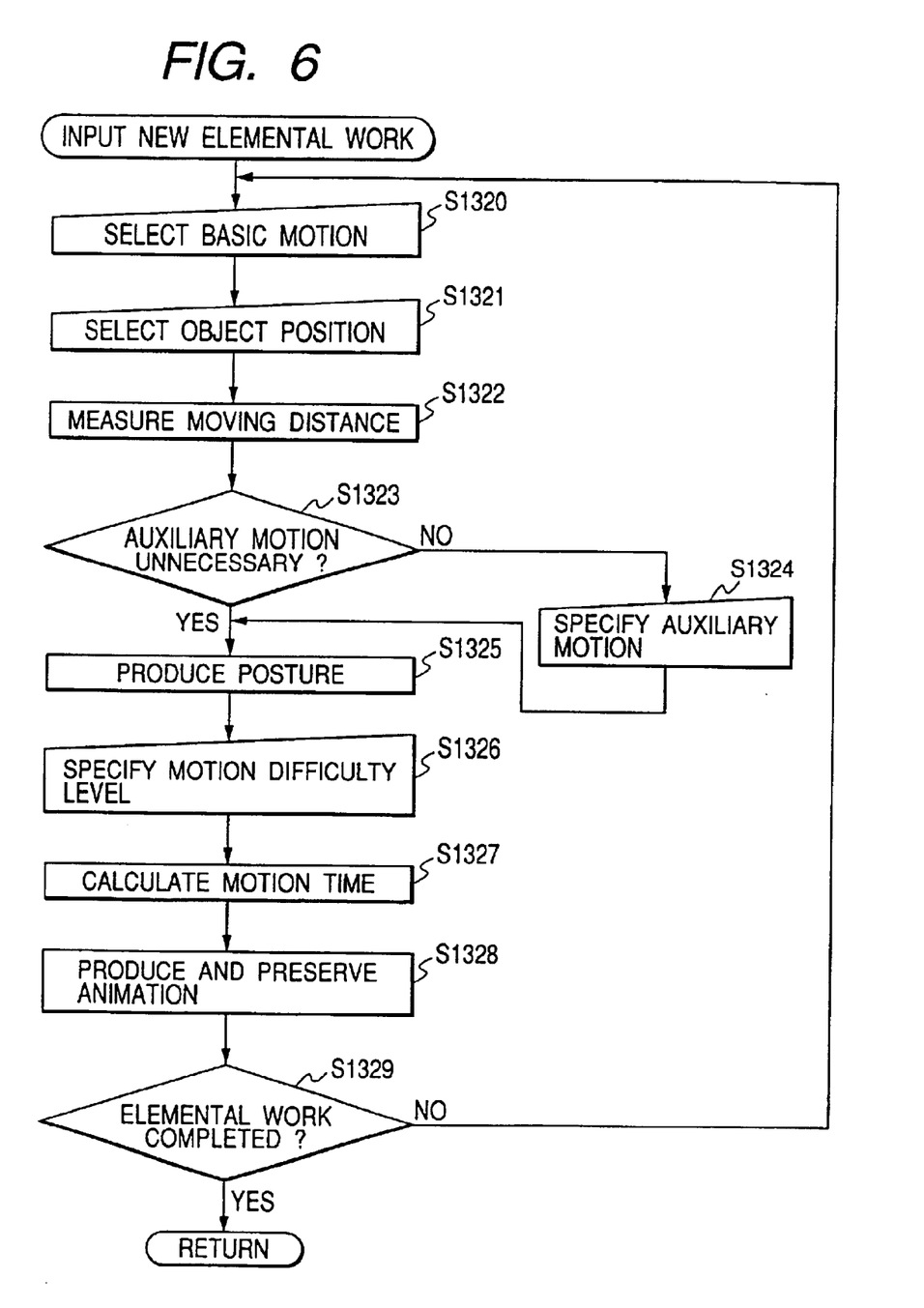
FIG. 6 is a flow chart showing a procedure to be taken when a user inputs work contents.

FIG. 6 is a flow chart showing a procedure to be taken when a user inputs an elemental work without using a work model, i.e., newly produces work contents. In this case, as compared with the case of the employment of the work model shown in FIG. 5, a difference is that a basic motion selection (S1320) and a motion difficulty level selection (S1326) are added as steps the user implements. The other is the same as the procedure shown in FIG. 5.

Figure 7:
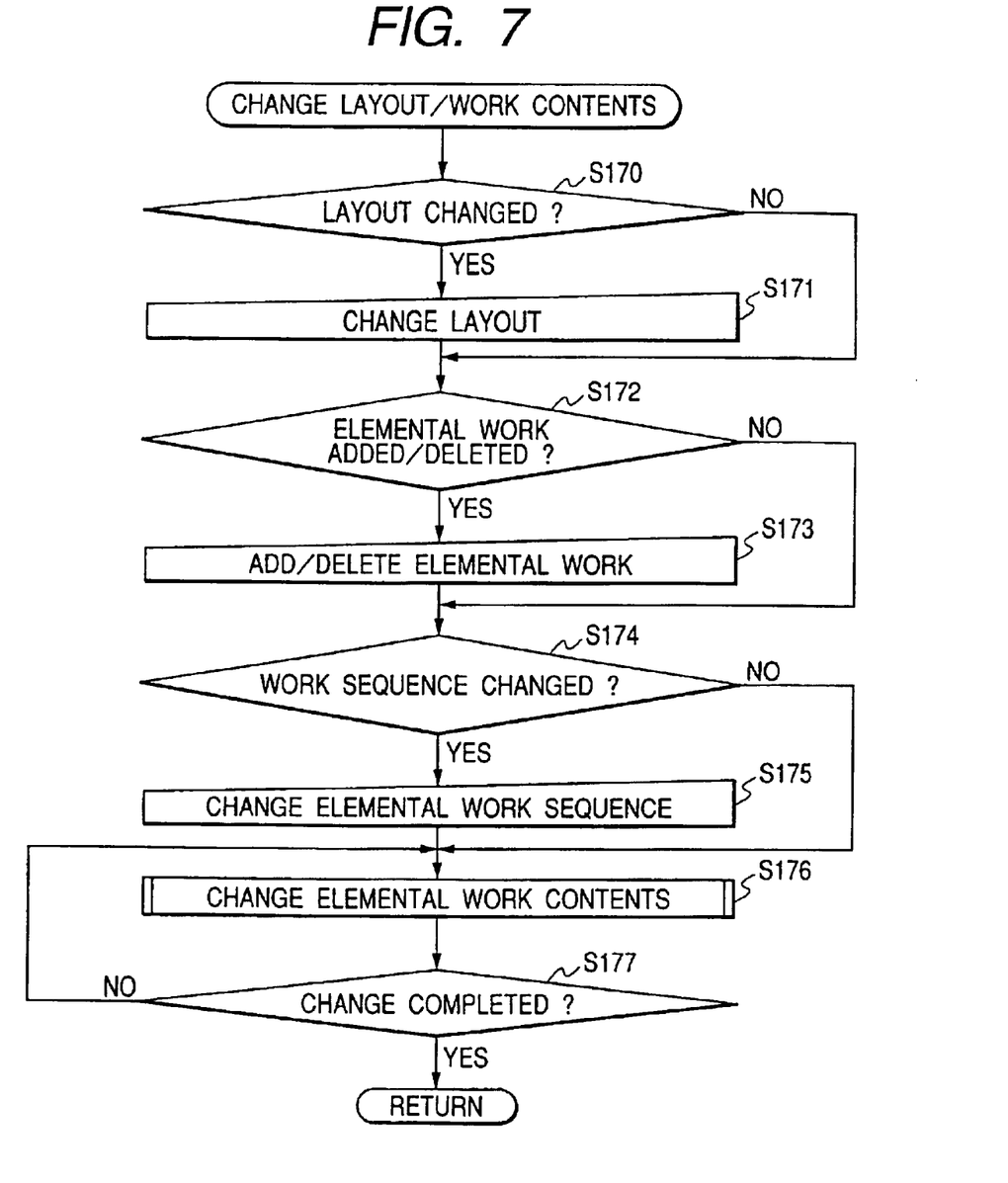
FIG. 7 is a flow chart showing a procedure for altering an animation.

Referring to a flow chart of FIG. 7, a description will be given hereinbelow of a procedure for alteration of layout/work contents.

First, in the case of the alteration of the layout of a work area, a user alters the layout of the work area (steps S170 and S171). In this case, there is a need to correct all elemental works.

Furthermore, in the case of the addition/deletion of an elemental work, the user adds/deletes the elemental work (steps S172 and S173). In this case, there is a need to correct elemental works subsequent to the added/deleted elemental work.

Following this, a judgment is made as to whether the sequence of the elemental work is altered or not (step S174). If affirmative, the alteration of the work sequence is made (step S175). In this case, there is a need to correct the elemental works subsequent to the sequence-altered elemental work.

Then, the alteration of the contents of all the elemental works in which alteration is necessary is implemented (steps S176 and S177).

Referring to a flow chart of FIG. 8, a description will be given hereinbelow of a procedure for alteration of the contents of an elemental work. In this case, the comparison in basic motion, motion object and spatial coordinate before and after the alteration is made for each key frame, and the reusable animation data is automatically extracted to present the user. The extraction of the reusable animation data is made in view of whether the object of motion is reusable and whether the posture of a worker model is reusable. The user can efficiently correct the animation through the use of the reusable data.

First, the animation data before the alteration is acquired from the database 48 (step S1750). In this case, the information to be acquired are the type and difficulty level of a basic motion, the posture and standing position of a worker model at the time of the motion start, the name of a motion object and the position thereof.

Subsequently, on the basis of the type of the basic motion, a judgment is made as to whether there is a possibility of a change of the posture of the worker model, that is, there is a change of the spatial data (step S1751). Concretely, a judgment is made as to whether the basic motion is a motion, such as "Reach", "Move", "Turn" or "Walk", which develops a change of the spatial data to produce the possibility of a change of the posture or a motion, such as "Grasp", "Position", "Release" or "Disengage", which develops no change of the spatial data to produce no possibility of the posture change.

As a result, if the basic motion does not develop the posture change, basically there is no need to re-input the data. However, in the case of a change of the object of motion, the input of the name of the motion object becomes necessary. Moreover, in the case of the basic motion which develops no possibility of the posture change, there is no need to make the confirmation about the change of the posture at the time of the motion start, and the motion time does not vary, so it is reusable.

On the other hand, in a case in which the basic motion has the possibility of the posture change, a confirmation is made as to whether the posture at the time of the motion start is changed or not, that is, whether a change of the posture at the time of the completion of the last basic motion takes place (step S1752). If there is a change in posture at the motion start, although the posture at the motion start varies, the final posture does not vary and, hence, is reusable without change. However, there is a need to re-calculate the motion time.

Furthermore, in the case of the change of the posture at the motion start, for example, if a change of the standing position of the worker model takes place, for the access to an object of motion, there is a need to insert a basic motion forming "Walk".

Thereafter, a judgment is made as to whether or not a change of an object of motion takes place (step S1753). If the judgment indicates the change of the motion object, the re-inputting of all data becomes necessary. Moreover, the motion object is again specified and the posture is again produced (step S1754). In this case, there is no need to confirm whether the position of the motion object is changed or not.

On the other hand, in the case of no change of the motion object, a judgment is made as to whether the position of the motion object is changed or not (step S1755). If the judgment indicates a change of the position of the motion object, the use of the positional data on the motion object and the posture of the worker model is not feasible, and only the name of the motion object is usable. Moreover, there is a case in which the relative position of the hand with respect to the motion object is reusable. For example, in the case of a basic motion forming "Reach", the position of the hand specified by the relative position with respect to the object becomes reusable.

Following this, the posture of the worker model is automatically re-produced and, when needed, the user manually fine-adjusts the posture of the worker model for a natural posture (step S1756).

Then, the data is re-calculated according to the change (step S1757) and the animation data is rewritten (step S1758).

The above-mentioned steps S1750 to S1758 are implemented with respect to all the basic motions organizing the elemental work (step S1759).

Figure 9:
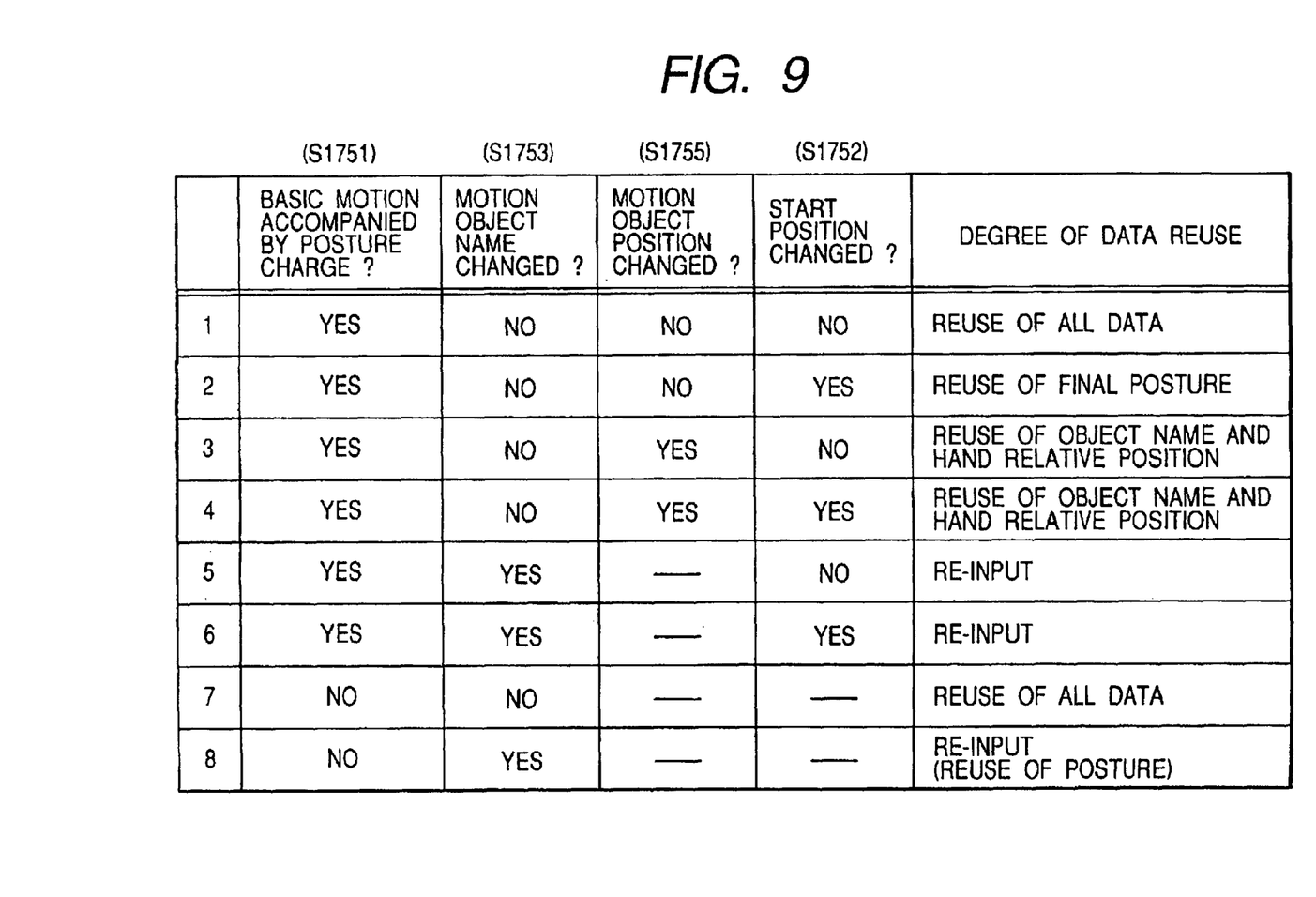
FIG. 9 is an illustration of criteria of judgment to be used in extracting reusable data from animation data before alteration.

FIG. 9 is an illustration of criteria of judgment to be used in extracting reusable data from animation data before the alteration on the basis of the judgment results of the aforesaid steps S1751, S1752, S1753 and S1755. A description will be given hereinbelow of the contents shown in FIG. 9.

(1) In a case in which the basic motion is accompanied by a change in posture, a change of an object of motion does not take place, a change of the position of the motion object does not take place and a variation in posture at the time of the motion start does not take place, all the animation data before the alteration are reusable, thus eliminating the need for the re-inputting of the data.

(2) In a case in which the basic motion is accompanied by a change in posture, a change of an object of motion does not take place, a change of the position of the motion object does not take place and a variation in posture at the time of the motion start takes place, the final posture before the alteration is reusable, and a change of the key frames themselves is unnecessary. In this case, because of the variation of the posture at the time of the motion start, the re-calculation of the motion time becomes necessary.

(3) In a case in which the basic motion is accompanied by a change in posture, a change of an object of motion does not take place, a change of the position of the motion object takes place and a variation in posture at the time of the motion start does not take place, the name of the motion object and the relative position of the hand are reusable, but, because of the change of the position of the motion object, a change of the posture becomes necessary.

(4) In a case in which the basic motion is accompanied by a change in posture, a change of an object of motion does not take place, a change of the position of the motion object takes place and a variation in posture at the time of the motion start takes place, the name of the motion object and the relative position of the hand are reusable, but, because of the change of the position of the motion object, a change of the posture becomes necessary.

(5) In a case in which the basic motion is accompanied by a change in posture, a change of an object of motion takes place and a variation in posture at the time of the motion start does not take place, the re-inputting of all the data becomes necessary, and an object is re-specified and a posture thereof is reproduced.

(6) In a case in which the basic motion is accompanied by a change in posture, a change of an object of motion takes place and a variation in posture at the time of the motion start takes place, the re-inputting of all the data becomes necessary, and an object is re-specified and a posture thereof is reproduced.

(7) In a case in which the basic motion is not accompanied by a change in posture and a change of an object of motion does not take place, all the animation data before the alteration are reusable, thus eliminating the need for the re-inputting.

(8) In a case in which the basic motion is not accompanied by a change in posture and a change of an object of motion takes place, the posture before the alteration is reusable without change, and only the motion object is re-specified.

Figure 8:
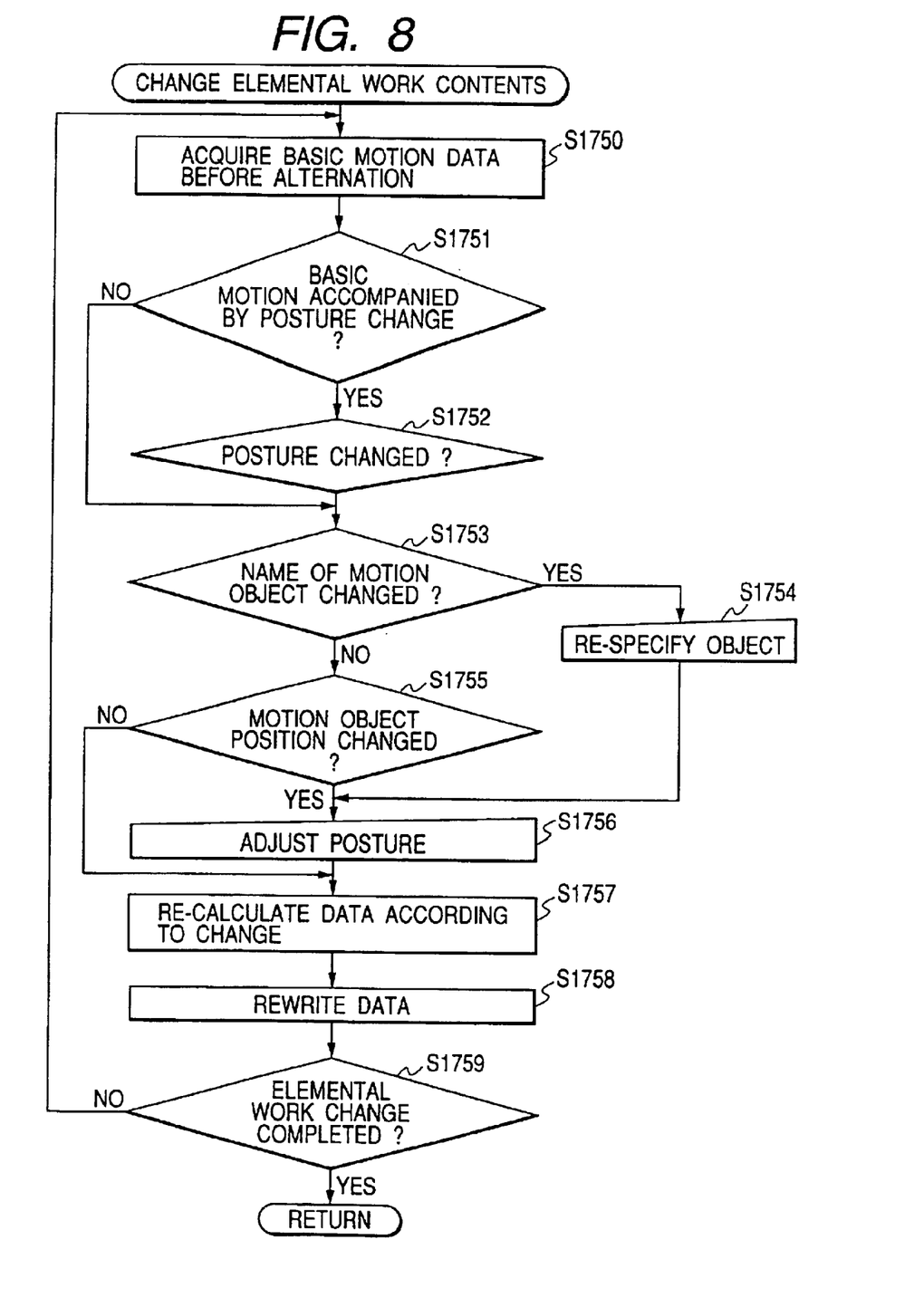
FIG. 8 is a flow chart showing a procedure for inputting alteration contents of an animation.
Figure 10:
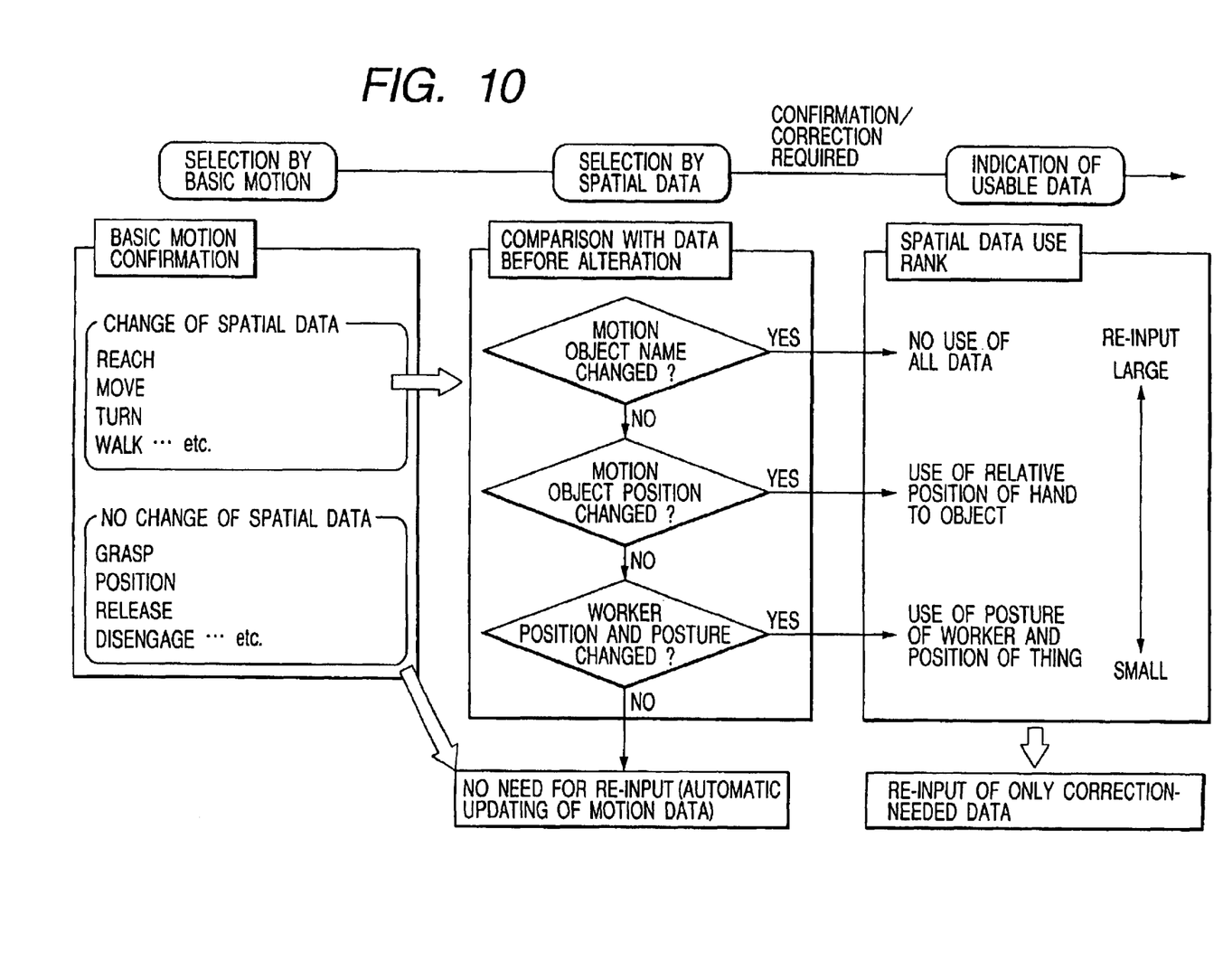
FIG. 10 is an illustration of a procedure of judgment to be used in extracting reusable data from animation data before alteration.

FIG. 10 illustratively shows the contents of the judgment procedure of the flow chart of FIG. 8. As FIG. 10 shows, the re-inputting-needed items can be specified through the selection according to basic motion and spatial data.

Furthermore, referring to FIG. 11, a concrete description will be given hereinbelow of an alteration of animation data. In the example shown in FIG. 11, the initial position of a driver is changed in the animation shown in FIG. 2.

First of all, in the initial frame, the position of the driver is shifted from the state suspended to a state existing on the table. Secondly, in the second frame a change of the basic motion "Reach" can occur in posture, no change of the object occurs, a change in position of the object occurs, and the posture at the time of the motion start does not vary. This corresponds to (3) of FIG. 9. Accordingly, the relative position of the hand and the name of the object before the alteration are reusable, but the posture is required to be newly produced. In addition, no change of the motion start time occurs and the motion time is automatically re-calculated. After the alteration, the moving distance of the hand becomes short, thereby shortening the motion time.

Moreover, in the third frame there is no possibility of a change in the posture of the basic motion "Grasp", and no change of the object occurs. This corresponds to (7) of FIG. 9. Accordingly, the animation data before the alteration are employable without change. The motion time does not change. However, since the motion time has been change in the previous frame, the motion start time is shifted earlier.

Still moreover, in the fourth frame there is a possibility of a change in the posture of the basic motion "Move", no change of the object occurs, no change in the position of the object occurs and a change in the posture at the motion start occurs. This corresponds to (2) of FIG. 9. Accordingly, the final posture before the alteration is employable, and in this case, the re-inputting of the data is unnecessary. The change of the motion start time and the re-calculation are automatically made.

Figure 11:
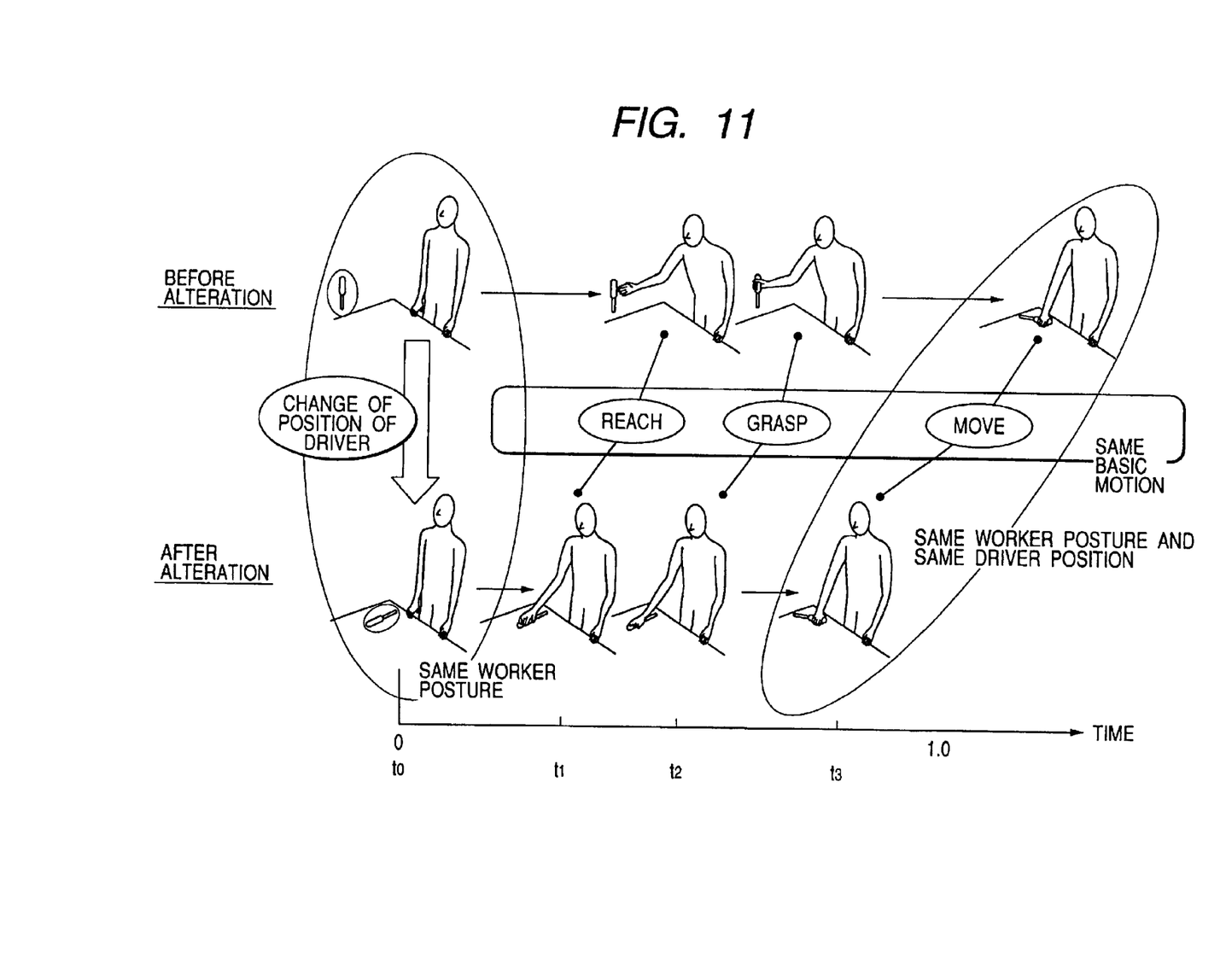
FIG. 11 is an illustration for describing a concrete example of alteration of the animation shown in FIG. 2.

In the example shown in FIG. 11, when in the second frame the user corrects only the posture that the worker model holds out its arm toward the driver, a correct animation after the alteration is obtainable.

As described above, even if an alteration is made in motion content of a worker model, there is no need for a user to re-input all information after the time of the alteration. The user can efficiently and easily produce an animation involving the alteration by utilizing the animation data before the alteration to the utmost. However, without employing the data presented as the reusable data, the user can also re-input them in his/her judgment.

In the present invention, the basic motion acquiring means corresponds to the steps S1311 and S1320 in FIGS. 5 and 6, the spatial data acquiring means corresponds to the steps S1312 and S1321, the key frame producing means corresponds to the steps S1316 and S1325, the motion time information acquiring means corresponds to the steps S1317 and S1327, the animation producing means and the animation information storing means correspond to the steps S1318 and S1328, the reusable information extracting means corresponds to the steps S1750 to S1755 in FIG. 8, the basic motion judging means corresponds to state S1751, the motion object judging means corresponds to the step S1753, and the motion object position judging means corresponds to the step S1755.

(Other Embodiments)

Although in the above-described embodiment the MTM technique is used for the calculation of the time among the key frames, the present invention is not limited to this, it is also possible to calculate the time among the key frames through the use of arbitrary methods.

It should be understood that the present invention is not limited to the above-described embodiments, and that it is intended to cover all changes and modifications of the embodiments of the invention herein which do not constitute departures from the spirit and scope of the invention.

What is claimed is:

1. An animation production apparatus, comprising:
   an animation production unit that produces an altered animation based on a first key frame and a subsequent second key frame of an existing animation; and
   a correction judging unit that judges a requirement for correcting a second key frame of said altered animation by a user when the first key frame of the existing animation has been modified.

2. The animation production apparatus according to claim 1, wherein the key frames have a plurality of parts, and the correction judging unit further judges which part of the second key frame of said altered animation is required to be corrected by the user.

3. The animation production apparatus according to claim 2, wherein the parts have a human body model and an object, and the correction judging unit judges whether the human body model is required to be corrected by the user and whether the object is required to be corrected by the user.

4. The animation production apparatus according to claim 3, further comprising:
   a memory that stores data of the first and second key frames of the existing and altered animations and motion data relating to a motion of the human body model between the first key frame and the second key frame of the existing and altered animations, wherein the motion data are associated with respective second key frames.

5. The animation production apparatus according to claim 4, wherein the correction judging unit judges whether the second key frame of the altered animation is required to be corrected by the user based on the motion data and the object of the existing animation.

* * * * *